UNITED STATES PATENT OFFICE 2,606,110

REDUCTION OF THE POWDERS OF THE OXIDES OF IRON OR IRON ALLOYS

Godshalk Berge, Chicago, Ill., assignor to Aladdin Industries, Incorporated, Chicago, Ill., a corporation of Illinois No Drawing. Application February 25, 1948, Serial No. 10,923

5 Claims. (Cl. 75—0.5)

This invention relates to the field of metallurgy, and more particularly to the production of relatively pure powdered metals and alloys by the thermal reaction of finely divided carbon with the oxides of the metals in particle form. This is a continuation in part of pending United States Application Serial No. 731,045, filed February 26, 1947, now abandoned.

Metal powders have been produced from their oxides by reaction with such reducing agents as gaseous hydrogen and by the reaction of the oxides with carbon monoxide which may result from separately heating or burning carbon-containing substances in insufficient air. These processes which have heretofore been used for the production of metal powders are subject to many disadvantages which handicap their ready adoption.

For example, in order to reduce iron oxide, $Fe_2O_3$, in hydrogen atmosphere, it is necessary continuously to supply hydrogen in large quantities to the reduction furnace while maintaining the temperature of the furnace at favorable reaction temperatures. In other words, heat must be continuously supplied to raise the incoming hydrogen to reaction temperature. The hydrogen gas is an expensive material which is dissipated in large quantities and, in addition, is a highly combustible and dangerous material, especially at the temperatures of use. Another important factor resides in the inability of the reducing gases fully to penetrate the mass in such manner that reduction takes place rapidly and uniformly at all times. Not infrequently, it is necessary to carry out the reaction for several hours or even days before all or even the greater portion of the material has been reduced. All of these factors render the processes of hydrogen reduction undesirable, especially from a cost standpoint. Comparatively, the hydrogen reduction process is about thirty times as expensive as the carbon reduction process which I have invented and which produces metal of equivalent purity.

Reduction of the metal oxides by gaseous carbon monoxide is subject to many of the disadvantages attributed to hydrogen reduction; that is, a long time is required completely to reduce the metal oxide and, in many instances, it is difficult to effect a complete reduction since some of the metal powders fuse or agglomerate as they are reduced to form large masses having a higher concentration of oxide at the center where the reducing gases are unable to penetrate.

In accordance with this invention, the metal oxides and carbon are mixed in suitable proportion and heated in the absence of air to a temperature, which is below the sintering temperature for the metal, until gaseous evolution is at a greatly reduced rate. The reaction product is then milled and intimately remixed whereupon it is subjected to a second heat treatment until gases again cease to be liberated at a detectable rate. The resulting product is relatively pure metal or alloy which can be milled and annealed in a reducing atmosphere at elevated temperatures at which the metal may or may not form an aggregate, but if it does, it is friable to the extent that it can easily be converted to particle or powder form.

More specifically, the oxides of the metal or metals in powder form are intimately mixed with carbon particles and heated in a confined chamber to a temperature which is insufficient to fuse the metals but is able to activate the reaction between the oxygen atoms and carbon to form gaseous carbon monoxide and carbon dioxide. Both of these gases are free of inherent dangers at the elevated temperature and can be safely handled. Suitable reaction temperatures, therefore, depend greatly on the metals being refined. Ordinarily, temperatures ranging from 1500 to 2000° F. are suitable for most metal refining, and best results are obtained at a temperature range between 1800 and 1900° F. When a temperature less than 1500° F. is used, the reaction rate is too low, and above 2000° F., the crystal growth of iron and iron alloys increases at an undesirable rate.

Under such conditions, reaction takes place fairly rapidly because of the intimate contact between the reacting ingredients and because the carbon monoxide which may be liberated is also in close proximity with the oxide for reaction therewith. This reaction is continued until the evolution of gases from the chamber has practically ceased.

Even under such ideal conditions, I have found that some free oxide, as much as 4 to 6 percent, may be present in the reaction product. In order to effect a more complete and more desirable reduction, it is expedient to disintegrate the reaction product, which ordinarily is in a spongy and easily friable mass, and then subject the powdered materials to another heat treatment after proper blending. The oxides which have become insulated from carbon are reassociated to effect substantially complete reduction in short order. If desired, regrinding and reheating may be continued until a metal or alloy of the desired purity is obtained.

The described reactions are ordinarily carried out in an enclosed furnace or chamber formed of heat resistant and inert materials, such as Nichrome, or furnaces with a ceramic lining. For many applications, I prefer to anneal the final reaction product of the two reduction reactions, and for this purpose, I pulverize the materials which are in a friable state and anneal the product by heating to about 1500° F. and slowly cooling in a reducing atmosphere such as is effected by hydrogen. Incidentally, during the annealing process, small amounts of oxide which may still be in the reaction product are further reduced so that the product of the annealing furnace is a purer metal product in powder form or readily friable form.

By the term "metals," as used herein, is meant iron and the alloys of iron with tin, copper, nickel, cobalt, molybdenum, and the like. A cardinal feature of this invention resides in a new alloy of iron and tin which has particular application as material of high permeability suitable for magnetic cores. For such purpose, an alloy of 1 to 10 parts tin to 99 to 90 parts iron may be used. However, best results are present in the ratio of 94 parts iron to 6 parts tin. Other iron alloys may be prepared having the composition of 60 to 99 parts iron and 70 to 25 parts nickel, or 99.9 to 90 parts iron to 0.1 part copper, etc. or ternary alloys consisting essentially of iron with copper, nickel, chromium, and the like in various percentages. There is ample reason to believe that the oxides of the non-ferrous metals, such as tin, cobalt, copper, and the like may also be reduced by the described process and that alloys thereof in various proportions may be directly produced by my new process from their respective oxides at a great saving in material, cost, time, and heat input.

I prefer to use relatively pure carbon in the form of charcoal for mixing and reacting with the metal oxides. Instead of charcoal, other carbonaceous materials may be used, such as coal, coke, carbon black, and the like. The amount of carbon is calculated fully to react with the oxide so that the final product is relatively free of carbon and relatively free of oxide. In some instances, such as when the metal powder is to be used in oil-less bearings, as much as 10 percent free carbon may be tolerated. In fact, free carbon in the latter application is advantageous to impart lubricating characteristics and to control the porosity of the product. In magnetic cores, more than 0.1 percent free carbon is objectionable. However, if a small percent, say less than 1.0 percent, is present in the final reaction product, it can be eliminated in part by the subsequent annealing, as previously pointed out.

It is desirable to incorporate sufficient carbon to react with the oxides. The amount of carbon, of course, varies with the type of oxides, the amount of gases bled from the furnace or chamber, and many other factors, including the trend of the reaction within the furnace itself. The following will illustrate the reactions which are possible.

1. $M_2O_3 + 3C \rightarrow 2M + 3CO$
2. $2M_2O_3 + 3C \rightarrow 4M + 3CO_2$
3. $M_2O_3 + 2C \rightarrow 2M + CO + CO_2$
4. $M_2O_3 + 3CO \rightarrow 2M + 3CO_2$
5. $2CO + O_2 \rightleftharpoons 2CO_2$ As will hereinafter be described, the ratio of carbon to oxide can be fairly accurately determined from the theoretical equations, and proper adjustment can be made in accordance with the properties desired by a few trial runs or analyses of the reaction products, which analyses are well known and easily performed.

In all reactions, it will be apparent that either $CO_2$ or $CO$ will be produced, and in all probability they will emit from the furnace in fairly equal proportion because of equilibrium reactions. Therefore, theoretically, the amount of carbon to be added should lie between that necessary to carry out reaction 1 and reaction 2 above. For reaction #1, 20 pounds of charcoal react with 100 pounds of $Fe_2O_3$, and in reaction 2, the ratio is 11 to 100. In actual practice, an iron having less than 0.3 percent free carbon and less than 1 percent oxide is produced when 100 parts of $Fe_2O_3$ are reacted with about 16 pounds of carbon. When free carbon is not objectionable in the final product, more may be used whereby a more rapid reaction will accordingly result.

To illustrate the production technique, the following examples are given:

*Example I*

In the production of powered iron for magnetic cores, 100 parts of $Fe_2O_3$, in particle form, are blended with about 16 parts of powdered charcoal. The blend is heated to 1800° F. or 1900° F. in a Nichrome pot until the evolution of gases has practically ceased. This takes about 2 to 8 hours. This indicates a slowing down of the reaction rate to an extent where it is uneconomical to continue further in the present state. However, analysis indicates that there is still about 4 to 6 percent oxide in the reaction product. The resulting mass, when cooled, is in a spongy, friable condition which is easily reduced to powder form. The powder is reblended and again reacted at 1800 to 1900° F. until the evolution of gases has ceased. The residue of the second reaction is also friable when cooled and easily reduced to powder form. Analysis of this final product usually shows less than 2 percent oxide. The second reaction product may be annealed by cooling from 1400 to 1600° F. in the presence of a reducing atmosphere which reduces the amount of free oxide still further. Cooling from 1500° F. in the annealing step may take as much as 5 hours. Instead of $Fe_2O_3$, other iron oxides, such as $Fe_3O_4$, etc., may be used.

*Example II*

134.5 pounds of iron oxide, $Fe_2O_3$, 7.6 pounds of tin oxide, $SnO_2$, and 20 pounds of charcoal, all in powdered form, are mixed well and fired in a Nichrome pot at a temperature between 1800 and 1900° F. for a period of approximately eight hours. The mixture is then cooled to room temperature and milled. The fine powder is then given a second firing at the same temperature for a period of approximately five hours. The product is then again cooled to room temperature and milled. The powder is then subjected to an annealing treatment in a hydrogen atmosphere starting at a temperature of 1500 to 1550° F. which is decreased slowly over a period of approximately five hours to 400° F. The alloy thus obtained is then milled to the desired fineness and is ready for use, for example, in permeability iron cores.

*Example III*

91 pounds of iron oxide, $Fe_2O_3$, 51 pounds of the oxide of nickel, $Ni_2O_3$, and 20 pounds of charcoal, all in powdered form, are blended and treated in the manner described in Example II.

It is not necessary to anneal the final reaction product when used for other purposes not requiring high permeability. Instead of the proportions used, the ratio of iron to nickel may be varied to produce the alloy desired. The final product, on analysis, contained 64 percent iron, 36 percent nickel, and less than 0.2 percent free carbon. The product, in powdered form, is particularly well adapted for formation of metal articles by powdered metallurgical processes.

*Example IV*

To 142 pounds of iron oxide, $Fe_2O_3$, there is added about 1.0 pound of copper oxide, or 0.6 percent copper, and 20 pounds of charcoal. All of these, in powdered form, are blended and fired successively at 1800 to 1900° F. after disintegrating and blending the powders between firing cycles. The resulting alloy contained 99.5 percent iron and 0.5 percent copper and was practically free of oxide and carbon.

While my process and the means for carrying the same into effect have been described above, my invention is not limited to the specific examples recited hereinabove, but the protection I desire to obtain by Letters Patent is set forth in the appended claims.

I claim as my invention:

1. The process of producing powders of iron and alloys of iron with one or more of the metals, tin, copper, nickel, cobalt, and molybdenum from their oxides comprising the steps of repeatedly blending and thermally reacting the powders of the oxides and carbon present in amounts ranging from 10–20 parts by weight of the metal oxides at a temperature below the sintering temperature for any of the metals but above 1500° F. until the liberation of gases has practically ceased, and milling the residue after each heat treatment.

2. The process for manufacturing ferromagnetic cores of iron and tin comprising blending the oxides of iron and tin in proportions to yield 1–10 parts tin to 99–90 parts iron with sufficient carbon fully to react with the oxide but not so much as to leave more than 0.1 percent free carbon, thermally reacting the mix at a temperature between 1500° F. and 2000° F. until the evolution of gas has greatly decelerated, regrinding and re-reacting the reaction product under the above conditions, powdering the second reaction product, and then molding the powder to core shape.

3. The process for manufacturing ferromagnetic cores comprising blending the oxides of iron and tin in proportion to yield 1–10 parts tin to 99–90 parts iron with carbon in proportion of 11–20 parts carbon to 100 parts of the metal oxides, thermally reacting the blend at a temperature of 1500–2000° F. until the evolution of gas has practically ceased, regrinding and re-reacting the reaction product under the above conditions, and then molding the latter reaction product to core shape after it has been reduced to particle form.

4. The process of producing powdered iron and alloys of iron suitable for the manufacture of ferromagnetic cores comprising the steps of blending the oxides of iron and tin in powdered form in amounts to yield 1–10 parts by weight tin to 90–99 parts by weight iron with carbon in proportions of about 11–20 parts by weight carbon to 100 parts by weight of the metal oxides, thermally reacting the blend at a temperature in excess of 1500° F. but below 2000° F. until the evolution of gas has practically ceased, thermally reacting the reaction product at least once more after it has been ground and blended at thermal conditions corresponding to the above further to reassociate the available carbon and metal oxides for the purpose of their complete elimination, tempering the reaction product by cooling down slowly from the temperature of about 1500° F. in reducing atmosphere, then reducing the tempered product to powdered form.

5. The process of producing powdered iron and alloys of iron suitable for the manufacture of ferromagnetic cores comprising the steps of blending the oxides of iron and tin in powdered form in amounts to yield 1–10 parts by weight tin to 99–90 parts by weight iron with carbon in proportions of about 11–20 parts by weight carbon to 100 parts by weight of the metal oxides, thermally reacting the blend at a temperature between 1800° F. and 1900° F. until the evolution of gas has practically ceased, thermally reacting the ground and blended reaction product at least once more at thermal conditions corresponding to the above further to reassociate the available carbon and metal oxides for the purpose of their complete elimination, tempering the reaction product by cooling down slowly from a temperature of about 1500° F. in reducing atmosphere, then reducing the tempered product to powdered form.

GODSHALK BERGE.

REFERENCES CITED

The following references are of record in the file of this patent:

UNITED STATES PATENTS

| Number | Name | Date |
| --- | --- | --- |
| 1,487,133 | Alexander | Mar. 18, 1924 |
| 1,558,262 | Greenwood | Oct. 20, 1925 |
| 2,055,732 | Schertel | Sept. 29, 1936 |
| 2,261,196 | Wellman et al. | Nov. 4, 1941 |
| 2,282,124 | Fahrenwald | May 5, 1942 |
| 2,339,137 | Berge | Jan. 11, 1944 |